Figure 1:
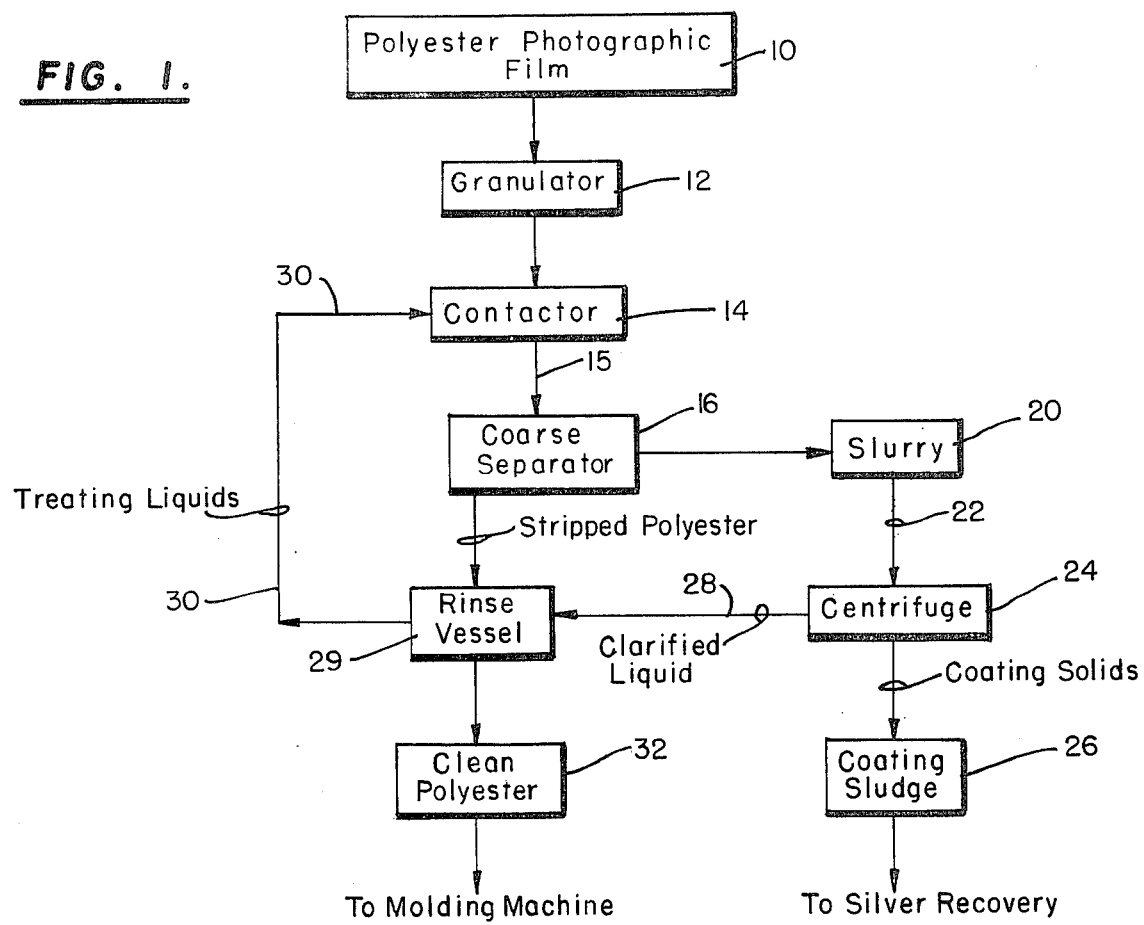

United States Patent [19]

Thornton et al.

[11] 3,928,253
[45] Dec. 23, 1975

[54] PROCESS FOR RECOVERY OF CLEAN POLYESTER MATERIALS

[75] Inventors: J. Scott Thornton, Chagrin Falls; Donald E. Glowe, Kent, both of Ohio

[73] Assignee: Horizons Incorporated, Cleveland, Ohio

[22] Filed: May 10, 1972

[21] Appl. No.: 252,327

[52] U.S. Cl. .................. 260/2.3; 134/10; 134/13; 134/15
[51] Int. Cl.² ................. G03C 11/24; B08B 3/08
[58] Field of Search ........... 134/10, 13, 15; 260/2.3; 117/63

[56] References Cited
UNITED STATES PATENTS

| | | | |
|---|---|---|---|
| 2,832,663 | 4/1958 | Drelich ................................. | 8/141 |
| 3,503,904 | 3/1970 | Dietz et al. ........................... | 260/2.3 |
| 3,652,466 | 3/1972 | Hittel et al. ......................... | 117/63 X |
| 3,740,267 | 6/1973 | Haylock ............................... | 134/10 |

Primary Examiner—Morris O. Wolk
Assistant Examiner—Timothy W. Hagan
Attorney, Agent, or Firm—Lawrence I. Field

[57] ABSTRACT

A procedure for separating and recovering clean polyester separately from the materials with which it is coated and for recovering desired values present in the coating materials, whereby the recovered polyester and other valuable recovered materials may be recycled thereby avoiding, or minimizing pollution from such materials.

When the starting material is a polyester photographic film, the treatment includes detaching the contaminants from the polyester film base by contacting the polyester photographic film scrap with an aqueous solution of monoethanolamine containing 2% to 15% by weight of water and having a temperature between 100°C and 170°C, for a time sufficient to remove both the coating and the subcoating from said base.

1 Claim, 2 Drawing Figures

PROCESS FOR RECOVERY OF CLEAN POLYESTER MATERIALS

The present invention relates to procedures for recovering clean polyester materials and other values from polyester photographic film and magnetic recording tape. The polyester is recovered as one product and the values in the non-polyester materials are recovered as separate products.

As a preferred embodiment, this description will deal with the recovery of clean polyester and silver values from polyester photographic film, but it will be readily apparent that the process is applicable to other raw materials such as magnetic recording tapes from which the polyester and magnetic iron oxide can be recovered separately and to still other raw materials.

Polyester film is being used in increasing amounts for photographic support, magnetic recording tape, graphic arts materials, electrical insulation, and other applications requiring a clear, strong, dimensionally stable chemically resistant film. In some of these applications, as in photographic film, the polyester is coated with binders, adhesives, and metal compounds. Because of the non-polyester materials associated with the polyester, used polyester photographic film has little value other than the intrinsic value of the silver contained in the coating. One current practice to recover silver from used photographic film utilizing a polyester support is to incinerate the film and reclaim silver from the ash by pyrometallurgical processing. The economics of this process are not favorable at present silver prices.

Other methods which have been proposed for recovering photographic support material are described, for example, in U.S. Pat. No. 3,047,435, Canadian Patent No. 626,996, and British Patent No. 1,134,967. These methods have used aqueous solutions of alkali, surfactant, or enzymes as well as non-aqueous alkaline glycols to remove the emulsion or other coating layers. These previous methods are limited in practice in that aqueous solutions of alkali, surfactants, or enzymes will not remove polymeric subcoatings associated with polyester films without seriously degrading the polyester while nonaqueous alkaline glycols will not remove all waxes and oils from the film surface and rapidly become saturated with gelatin. Therefore they are not suitable for recovering both polyester and coating layers from used photographic film.

It would be desirable to convert used polyester films into clean polyester which can be used as a raw material for the production of fibers or film, or other articles. It would also be desirable to recover the photographic material coated on the polyester base, which material can be further processed to recover silver. Recovery of the polyester which resists biodegradation and of the silver in forms which can be reused will reduce solid waste disposal problems as well as reduce depletion of natural resources by permitting recycling these materials.

A principal object of this invention is to produce two useful products from polyester photographic film, namely: (1) clean polyester materials suitable for reuse in the manufacture of extruded film or fiber, unextruded fibers, or for making shaped articles, and (2) separated coating sludge which contains the silver and other constituents in the photographic layer on the polyester base.

A more specific objective of the invention is to provide a process which in a single treatment separates the polyethylene terephthalate film base from the photographic emulsion, the subcoat usually present to improve adhesion of the silver-containing layer to the film base, and other dirt and oils associated with used film.

Another object of this invention is to provide a process to produce clean polyester and a sludge containing coating materials from polyester photographic film, the process involving recycle of reagents in a closed system thereby eliminating pollution to the environment from contaminating vapors or liquid effluents.

Figure 2:
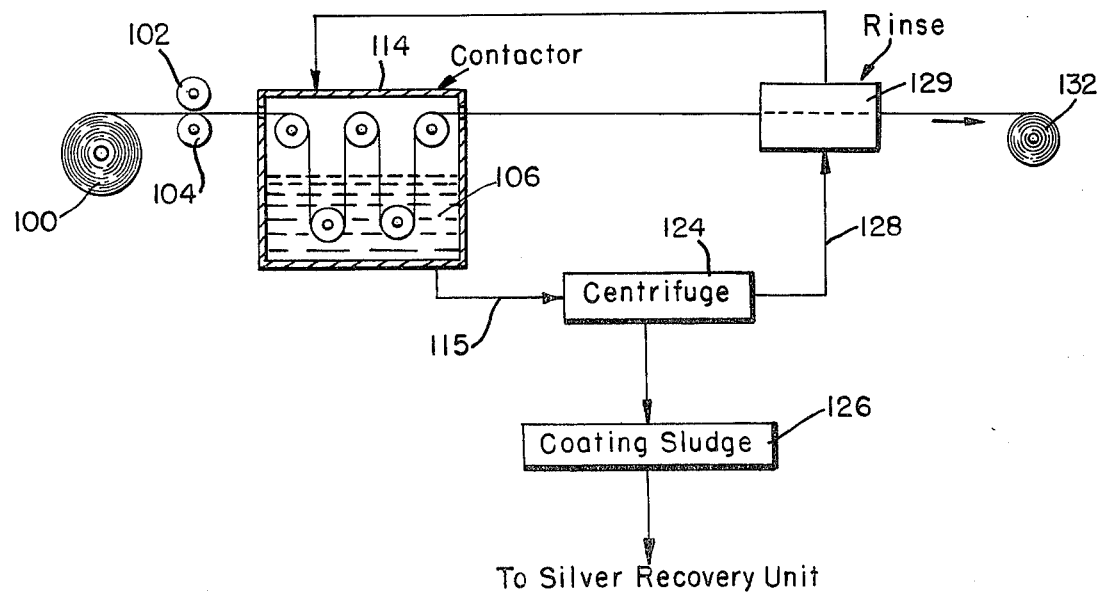

These and other objects of the invention will be pointed out or will be made apparent from the description which follows taken in conjunction with the drawings in which FIG. 1 is in the form of a flowsheet depicting a preferred process; and FIG. 2 is a schematic diagram of a modification of the process of FIG. 1.

As indicated above, the process is particularly suited to the removal of coatings and subcoatings from polyester photographic film. In such films, the film base is usually polyethylene terephthalate and the coatings on such base comprise a variety of minerals, binders, adhesives, waxes, oils, or other materials placed on the film during manufacture or subsequent use. The subcoating may consist of copolymers of vinyl chloride of vinylidene chloride together with an acid such as itaconic, acrylic or methacrylic acid. The subcoating is provided to promote adhesion of the usual gelatin-cellulose acetate composition photographic coatings to the polyester film base.

In order to recover clean polyester and a sludge containing the coating materials, the process comprises the steps of:

1. wetting the polyester photographic film with an aqueous alkaline solution of an organic solvent which will loosen and detach both the coating and subcoating from the surface of the polyester film base, emulsify oils and waxes, and dissolve the binders associated with the coating constituents;
2. separating the polyester film from the reagent and removed coating and subcoating;
3. separating the removed coating materials from the reagent, to produce a metallic sludge and a clarified reagent;
4. rinsing the separated film with the clarified reagent; and
5. recycling the clarified reagent from the rinse stage (4) to step (1) in carrying the process forward on additional photographic film.

The flowsheet shown in FIG. 1 schematically depicts this process as preferred. The developed or undeveloped photographic film 10, entering the process as sheet or roll, or individual pieces of irregular size and shape, is chopped or cut in a granulator 12 to a flake of approximately ¼ inch diameter. The flake is then charged into a closed heated vessel 14 in which it is brought into physical contact with ethylene glycol containing from 0.1% to 5% NaOH and 2% to 15% water, by weight. The vessel and its contents are heated to a temperature between 100°C and 170°C, preferably between 140°C and 160°C, and the mixture of flake and glycol solution is agitated for a time sufficient to loosen the coating materials from the polyester surface. Usually agitation from 5 to 15 minutes is sufficient to accomplish the desired separation.

After the separation is complete and all of the coating has been stripped from the flake, the film-glycol slurry is pumped to a coarse separator 16 containing a sieve of sufficient size, about 0.30 inch opening, to retain the film while allowing the ethylene glycol solution slurry containing the coating materials to pass to tank or collector 20. This separator can be a simple closed tank containing a mesh collecting basket or a continuous belt filter, as the process is not dependent on type of equipment used for this separation.

The effluent 22 from the coarse separation is pumped to a centrifuge 24 for removal of the suspended coating materials from the ethylene glycol solution. Other types of processing equipment, for example, pressure or vacuum filters, may be used for this step providing that alternate equipment is able to clarify the ethylene glycol solution to a maximum of 0.05% suspended solids by weight; a necessary requirement since the clarified liquid is fed to a rinse vessel 29 where it is used to rinse the stripped film of any coating residue that may have remained after the coarse separation in separator 16. The ethylene glycol solution is then recycled by conduit 30 to the closed heated vessel 14. The clean, rinsed polyester is recovered as product 32.

The solids, discharged from the centrifuge 24 as a thickened sludge 26 contain silver. Further recovery of the contained silver and other by-products can be effected any any of a variety of procedures.

The polyester flake 32 is, after rinsing with the clarified centrifuge effluent 28, clean and suitable as a raw material for making extruded film or fiber or other shaped articles.

A distinct advantage of this process is the ability to operate in closed vessels and to recycle the glycol solution through the rinse to the starting reactor, thereby minimizing reagent loss to the atmosphere and eliminating the need for additional rinse solutions.

Feed of smaller or larger particle size than ¼ inch may be used in the process. For example, a particle as small as 0.030 inch is treated by choosing a sieve opening in the coarse separator 16 to retain a 0.030 inch particle. The equipment can be modified to accomodate large sheets, 1 to 2 feet across or larger, by increasing the size of the vessels, piping, and other equipment proportionally.

Instead of ethylene glycol other reagents such as alkaline propylene glycols and monoethanolamine, have been used in the process with equal success. Reagents other than those named would also give acceptable results providing that such other reagents are miscible in water and are alkaline or are made alkaline as determined by titration with a mineral acid such as HCl within the limits of 0.01 N to 5 N calculated as equivalent NaOH.

The process can be modified to produce clean polyester film in continuous strip form as schematically shown in FIG. 2. The developed or undeveloped film entering the process as a roll 100 is fed by driven rollers 102/104. The continuous strip 100 passes through a pool 106 of heated ethylene glycol solution containing 0.1% to 5% NaOH and 2% to 15% water, by weight, at a temperature between 100°C and 170°C, preferably between 140°C to 160°C in a heated contactor 114. The speed of the strip is adjusted so that residence time of the strip 100 in the pool of ethylene glycol will be sufficient to loosen the coating materials from the polyester surface. The residence time can be increased by slowing the rate of strip travel. Loosening of the coating is increased by flexing the strip, e.g., by passing it around a number of rollers immersed in the pool of ethylene glycol solution.

The strip exits the reactor 114 to an adjacent rinse vessel 129. The effluent 115 from the contactor 114 is pumped to a centrifuge 124 or other separating device as described in the process of FIG. 1. The clarified solution 128 is used to rinse the strip after which the solution is pumped back to the heated vessel 114.

The coating solids can be handled as previously stated. The clean polyester 132 in continuous strip is suitable as a raw material for unextruded fibers or other strip applications and the coating sludge 126 is processed to recover the silver and other values as noted above.

The examples which follow are intended to illustrate the invention and are not intended to limit the same.

EXAMPLE 1

Twenty pounds of aerial photographic film were granulated to a ¼ inch nominal particle size and placed in a heated vessel containing 100 gallons of ethylene glycol with 1% NaOH and 10 gallons of water at 150°C and slowly mixed. After a short time (about 1 minute), the coating was observed lifting from the surface of the film base. Stirring continued for 15 minutes to insure complete contact of liquid with all the pieces of film.

After the 15 minute residence time in the heated vessel, the mixture was pumped to a strainer containing a screen of 0.030 inch opening which allowed the ethylene glycol solution containing the solid coating materials to pass, but which retained the film base flake. The effluent was then pumped through a pressure leaf filter which retained the coating materials. The clarified ethylene glycol solution was again pumped to the strainer to rinse any remaining coating particles from the film base particles, then recycled to a storage tank for use with another batch of film.

The cleaned film was suitable as a raw material for extrusion as a film or compounding to a molding composition. The coating sludge remaining on the filter was processed to recover the silver by pyrometallurgical techniques.

EXAMPLE 2

Ten sheets of 14 × 17 inches x-ray photographic film weighing about 1 lb. was placed in a steel tank containing 15 gallons of ethylene glycol with 0.5% NaOH and 0.5 gallons of water at 180°C. The mixture was stirred slowly. After 2 minutes the coating containing the silver was observed lifting from the film and emulsifying in the alkaline ethylene glycol. Stirring was stopped after 10 minutes and the mixture was then poured through a sieve with 0.30 inch openings. The sieve effluent was filtered through a Buchner vacuum filter and the clarified effluent poured over the polyester sheets to flush off any residue of coating from the film base.

The cleaned sheets were suitable as raw material for extrusion, fibrilating or compounding. The coating sludge was removed from the filter and processed to recover the silver by pyrometallurgical techniques.

EXAMPLE 3

A roll of 9½ inch wide aerial film was cleaned on a modified continuous photographic film processing machine. As modified the film was fed to drive rolls and directed by means of idler and take-up rolls through two tanks.

The first tank contained 25 gallons monoethanolamine and 2 gallons of water at 140°C. The second contained ten spray nozzles which directed a spray of filtered monoethanolamine at the film strip. The film was run at about 2 linear feet per minute which gave film residence time of 12 minutes in the first monoethanolamine solution tank and an equal time in the monoethanolamine solution in the rinse tank. Liquid and solids therein, discharged from the bottom of the first tank were passed through a pressure leaf filter to remove the suspended particles of coating material, and the clarified reagent was sprayed onto the moving film strip in the second tank. Overflow from the rinse was recycled to the first treating tank.

The cleaned strip film was suitable as raw material for extrusion, fibrilating or compounding or it could be used, as recovered, in the same manner as virgin polyester film, for strapping tape, electrical insulation, and other known applications. The sludge removed from the filter was processed by pyrometallurgical techniques into metallic silver.

EXAMPLE 4-15

Aerial photographic film was chopped to about ¼ inch particle size and 100 gm of the flake placed in each of a series of 2 liter beakers containing 1 liter of reagent as shown in the following examples:

| Example | Wt. % NaOH in Glycol | Wt. % Water in Glycol | Temp. (°C) | Results |
|---------|----------------------|------------------------|------------|----------------|
| 4       | 0.00                 | 0.0                    | 150        | Unsatisfactory |
| 5       | 0.10                 | 5.0                    | 90         | Unsatisfactory |
| 6       | 0.10                 | 10.0                   | 100        | Satisfactory   |
| 7       | 0.10                 | 15.0                   | 150        | Satisfactory   |
| 8       | 0.10                 | 2.0                    | 170        | Satisfactory   |
| 9       | 0.10                 | 5.0                    | 175        | Unsatisfactory |
| 10      | 1.00                 | 5.0                    | 90         | Unsatisfactory |
| 11      | 5.00                 | 0.0                    | 90         | Unsatisfactory |
| 12      | 5.00                 | 15.0                   | 150        | Satisfactory   |
| 13      | 5.00                 | 10.0                   | 170        | Satisfactory   |
| 14      | 5.00                 | 5.0                    | 175        | Satisfactory   |
| 15      | 5.00                 | 0.0                    | 170        | Unsatisfactory |

We claim:
1. A process for the separate recovery of clean polyester and contaminants associated therewith from polyester photographic film scrap consisting of a polyester base, a subcoating on said base said subcoating consisting essentially of copolymers of vinyl chloride or vinylidene chloride with an acid selected from the group consisting of itaconic, acrylic and methacrylic and a silver containing gelatine coating on said subcoating which comprises:
   1. contacting said polyester photographic film scrap with an aqueous solution of an alkaline organic liquid reagent which will detach the contaminants from the polyester film base material; said aqueous solution consisting essentially of monoethanolamine and 2% to 15% by weight of water and having a temperature between 100°C and 170°c, for a time sufficient to remove both the coating and the subcoating from said base;
   2. physically separating the polyester material from the solution and contaminants; and
   3. recovering the resulting clean polyester material.

* * * * *